(12) United States Patent
Roscoe et al.

(10) Patent No.: US 8,564,915 B2
(45) Date of Patent: Oct. 22, 2013

(54) METHODS, SYSTEMS, AND APPARATUS FOR DETECTING ARC FLASH EVENTS USING LIGHT AND TIME DISCRIMINATION

(75) Inventors: George William Roscoe, Atlanta, GA (US); Robert Joseph Caggiano, Wolcott, CT (US); Daniel Edward Delfino, West Hartford, CT (US); Thomas Frederick Papallo, Jr., Farmington, CT (US)

(73) Assignee: General Electric Company, Schenectady, NY (US)

( * ) Notice: Subject to any disclaimer, the term of this patent is extended or adjusted under 35 U.S.C. 154(b) by 259 days.

(21) Appl. No.: 12/877,181

(22) Filed: Sep. 8, 2010

(65) Prior Publication Data
US 2012/0057263 A1 Mar. 8, 2012

(51) Int. Cl.
*H02H 3/00* (2006.01)
(52) U.S. Cl.
USPC .......................................................... 361/42
(58) Field of Classification Search
USPC ......... 361/42, 43, 93.1, 2, 111, 56, 57, 54, 55
See application file for complete search history.

(56) References Cited

U.S. PATENT DOCUMENTS

| | | | |
|---|---|---|---|
| 3,391,361 A | 7/1968 | Jencks et al. | |
| 4,791,518 A * | 12/1988 | Fischer | 361/2 |
| 4,878,144 A * | 10/1989 | Nebon | 361/96 |
| 6,229,680 B1 * | 5/2001 | Shea | 361/42 |
| 6,252,365 B1 | 6/2001 | Morris et al. | |
| 6,867,955 B2 * | 3/2005 | Chou et al. | 361/42 |
| 7,035,068 B2 * | 4/2006 | Shea | 361/42 |
| 7,203,040 B2 | 4/2007 | Shipp et al. | |
| 7,292,422 B2 | 11/2007 | Culligan et al. | |
| 7,646,575 B2 | 1/2010 | Weiher et al. | |
| 7,791,846 B2 * | 9/2010 | Roscoe et al. | 361/2 |
| 7,821,749 B2 * | 10/2010 | Asokan et al. | 361/1 |
| 2007/0242402 A1 | 10/2007 | Papallo et al. | |
| 2008/0142486 A1 | 6/2008 | Vicente et al. | |
| 2008/0239598 A1 * | 10/2008 | Asokan et al. | 361/56 |
| 2010/0072352 A1 * | 3/2010 | Kesler et al. | 250/216 |
| 2010/0073831 A1 * | 3/2010 | Schweitzer, III | 361/42 |

* cited by examiner

*Primary Examiner* — Stephen W Jackson
(74) *Attorney, Agent, or Firm* — General Electric Company

(57) ABSTRACT

A power equipment protection system includes a circuit breaker, a current sensor configured to measure a current through a circuit, a light sensor configured to detect a light event, and a controller communicatively coupled to the current sensor and to the light sensor, wherein the controller is configured to determine whether the light event originated from operation of the circuit breaker.

20 Claims, 5 Drawing Sheets

METHODS, SYSTEMS, AND APPARATUS FOR DETECTING ARC FLASH EVENTS USING LIGHT AND TIME DISCRIMINATION

BACKGROUND OF THE INVENTION

The embodiments described herein relate generally to arc flash detection and mitigation and, more particularly, to arc flash detection systems for use in reducing nuisance detections.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables arc formation.

An arc flash is caused by a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of heat, intense light, pressure waves, and/or sound waves, sufficient to damage the conductors and adjacent equipment. However, the current level of a fault that generates an arc flash is generally less than the current level of a short circuit, such that a circuit breaker generally does not trip or exhibits a delayed trip unless the circuit breaker is specifically designed to handle an arc fault condition. Although agencies and standards exist to regulate arc flash issues by mandating the use of personal protective clothing and equipment, there is no device established by regulation that eliminates arc flash.

Standard circuit protection devices, such as fuses and circuit breakers, generally do not react quickly enough to mitigate an arc flash. One known circuit protection device that exhibits a sufficiently rapid response is an electrical "crowbar," which utilizes a mechanical and/or electro-mechanical process by intentionally creating an electrical "short circuit" to divert the electrical energy away from the arc flash point. Such an intentional short circuit fault is then cleared by tripping a fuse or a circuit breaker. However, the intentional short circuit fault created using a crowbar may allow significant levels of current to flow through adjacent electrical equipment, thereby still enabling damage to the equipment.

Light sensors may be used to detect the presence of light emitted during an arc flash. However, such sensors are often sensitive to low light levels such that they also detect non-arc-flash light and trigger a "nuisance trip" of a circuit protection device. For example, a typical arc flash event can produce light with luminous flux on the order of 100,000 lux at a distance of three to four feet from the arc flash event, while known light sensors generally saturate at 700 lux or less. Light emitted by a circuit breaker during a trip, by space lighting, or by direct sunlight may cause the light sensor to falsely detect an arc flash event. At least some known arc flash detection systems using a particular venting pattern or light sensors that are positioned such that light released during a circuit breaker interruption, for example, does not sufficiently saturate the light sensor. However, reducing the amount of light released during a circuit breaker interruption can negatively affect circuit breaker performance. Thus, there is a need for an arc flash detection system that reliably detects arc flash events and mitigates undesired nuisance trips of circuit protection devices.

BRIEF DESCRIPTION OF THE INVENTION

In one aspect, a method of operating a circuit breaker includes detecting a light event using a light sensor and determining whether the light event originated from operation of the circuit breaker.

In another aspect, a power equipment protection system includes a circuit breaker, a current sensor configured to measure a current through a circuit, a light sensor configured to detect a light event, and a controller communicatively coupled to the current sensor and to the light sensor, wherein the controller is configured to determine whether the light event originated from operation of the circuit breaker.

In another aspect, a controller is provided for use with a power equipment protection system. The controller includes a processor configured to receive a signal representative of a measured current level from a current sensor, receive a signal representative of a detection of a light event from a light sensor, and determine whether the light event originated from operation of a circuit breaker.

DETAILED DESCRIPTION OF THE INVENTION

Exemplary embodiments of methods, systems, and apparatus for use in detecting and mitigating arc flash events are described herein. The embodiments described herein facilitate more reliably detecting arc flash events in power distribution equipment enclosures using current and light by discriminating against light events that occur during a known trip time by a circuit breaker.

Exemplary technical effects of methods, systems, and apparatus described herein enable more reliable detection of arc flash events such that the energy associated with such events can be diverted to a self-contained arc flash containment device. During an arc flash event, the current through a circuit rises rapidly and light energy will typically be released almost immediately. When a circuit breaker is used to mitigate such a rapid rise in current, the current level will persist in the circuit for a predetermined amount of time before the circuit breaker begins a circuit interruption and releases light energy. Embodiments described herein function such that, when a current rise is initially detected and if light is not detected after a predetermined time period, a secondary algorithm is used to determine whether the circuit breaker is initiating a circuit interruption or whether an arc flash event is occurring. For example, a circuit breaker with a known trip response time of approximately 0.25 seconds will initiate a circuit interruption within a certain amount of time, such as 0.22 seconds. The embodiments described herein enable a detection device to detect a high current level during a certain time duration, and to determine whether light detection occurs outside of the time duration. Detection of a light event outside of the time duration may be associated with an arc flash event.

Figure 1:
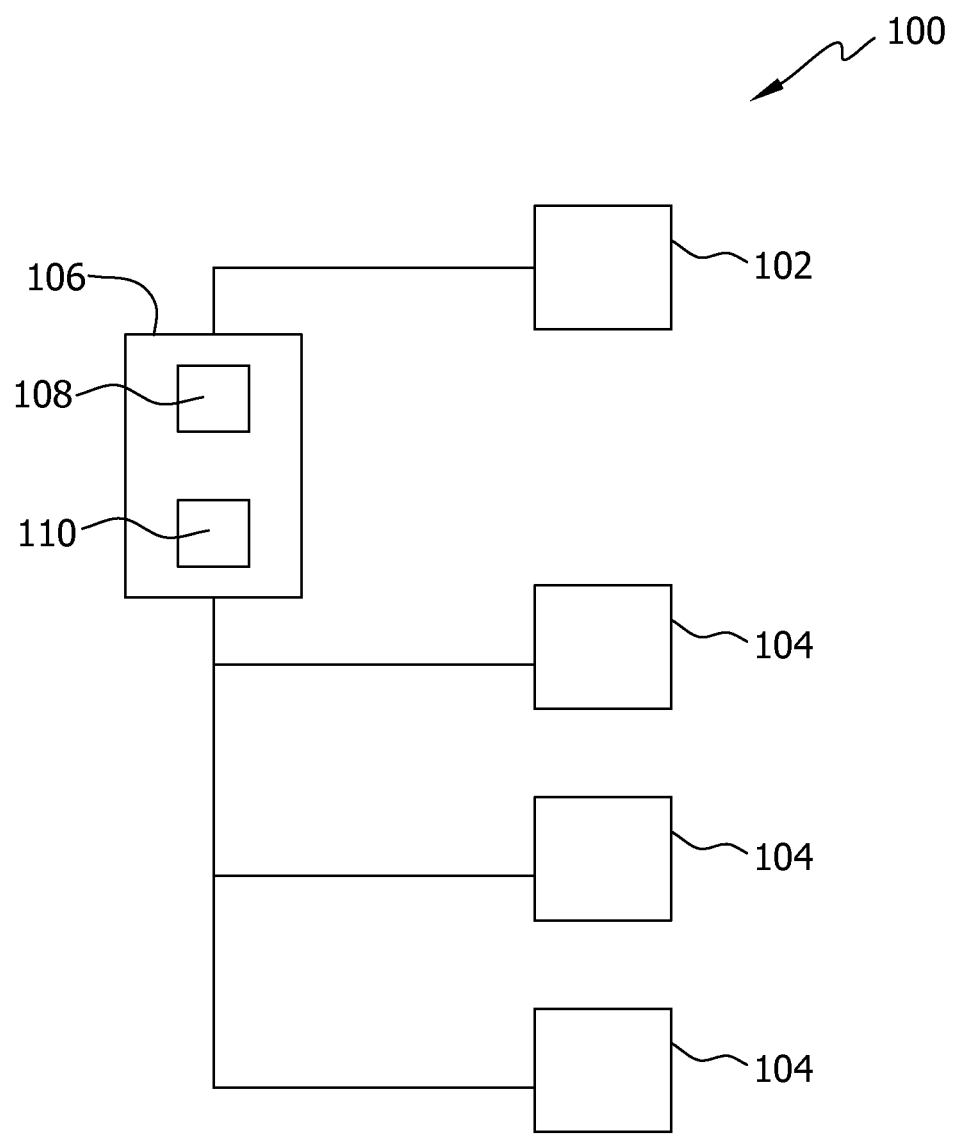
FIG. 1 is a schematic block diagram of an exemplary arc flash detection device.

FIG. 1 is a schematic block diagram of an exemplary arc flash detection device 100 for use in detecting an arc flash event using light and time discrimination. In the exemplary embodiment of FIG. 1, system 100 includes a current sensor 102 that measures a current level through a conductor (not shown in FIG. 1). Moreover, current sensor 102 generates a signal proportional to the current level. Current sensor 102 may detect an AC current and generate an analog output signal or a bipolar output signal that duplicates the wave shape of the sensed current. Alternatively, current sensor 102 may detect an AC current and generate a unipolar output signal that is proportional to an average value of the sensed current or an RMS value of the sensed current. Moreover, current sensor 102 may detect a DC current and generate a unipolar output signal that duplicates the wave shape of the sensed current, or may generate a digital output that switches when the sensed current exceeds a certain threshold. Exemplary current sensors include, without limitation, a current transformer, a Hall effect sensor, a resistive sensor, or any suitable sensor that is configured to detect a current level and to generate an output signal representative of the current level.

Moreover, system 100 includes a plurality of light sensors 104 that detect a light event. Equipment enclosures include a number of obstructions that effectively block light from at least some light sensors 104. Accordingly, in order to maintain adequate coverage, light sensors 104 are dispersed throughout the equipment enclosure in the vicinity of conductors. Light impinges on light sensor 104, including ambient light, light generated by a trip of a circuit breaker (not shown in FIG. 1), and/or light generated by an arc flash event. If the light is of sufficient intensity to saturate light sensor 104, then light sensor 104 generates a signal representative of the detection. For example, light sensor 104 may generate a signal proportional to a light level of the light event. Alternatively, light sensor 104 may generate a signal that indicates that the detection occurred, such as a change in the signal at when a specified level is detected. The signal is analyzed with respect to its relationship with a time-based relationship between a current level and detection of light to determine whether an arc flash event has occurred. In an alternative embodiment, the light is attenuated by a light filter (not shown) by a specified percentage. If the attenuated light is of sufficient intensity to saturate light sensor 104, then light sensor 104 generates the signal representative of the detection. The light filter enables system 100 to discriminate between nuisance light and light generated by an arc flash event.

In the exemplary embodiment of FIG. 1, system 100 also includes a controller 106 that is coupled, such as communicatively coupled, to current sensor 102 and to light sensor 104. Moreover, controller 106 includes a memory area 108 that is configured to store circuit breaker trip data, such as a plurality of current levels and a time period necessary for a circuit breaker to open at each current level. The relationship between one or more current levels and a respective time period necessary for a circuit breaker to open may be stored in, for example, a memory map, a database, in tabular form, or in a text file. However, it should be understood that memory area 108 may store the current levels and the time periods in any suitable manner. Moreover, it should be understood that memory 108 may include any suitable manner for relating the current levels to the time periods.

Controller 106 also include a processor 110 coupled to memory area 108. Processor 110 receives the signals from current sensor 102 and light sensor 104, and analyzes the signals using the time-based correlation stored in memory area 108 to determine whether an arc flash event has occurred. When processor 110 determines that an arc flash event has occurred, it outputs a signal to an arc containment device (not shown in FIG. 1) to mitigate damage to electrical distribution equipment by the arc flash event. In some embodiments, processor 110 may determine whether an arc flash event has occurred based on other parameters in addition to light and current, such as sound, pressure, heat, or other suitable parameters detected by suitable sensors.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Moreover, memory area 108 stores program code and instructions, executable by processor 110, to control and/or monitor current sensor 102, light sensors 104, or any other device that is coupled to controller 106. Memory area 108 may include one, or more than one, forms of memory. For example, memory area 108 can include random access memory (RAM), which can include non-volatile RAM (NVRAM), magnetic RAM (MRAM), ferroelectric RAM (FeRAM) and other forms of memory. Memory area 108 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 108. Memory area 108 may also be, or include, a detachable or removable memory, including, but not limited to, a suitable cartridge, disk, CD ROM, DVD or USB memory.

Figure 2:
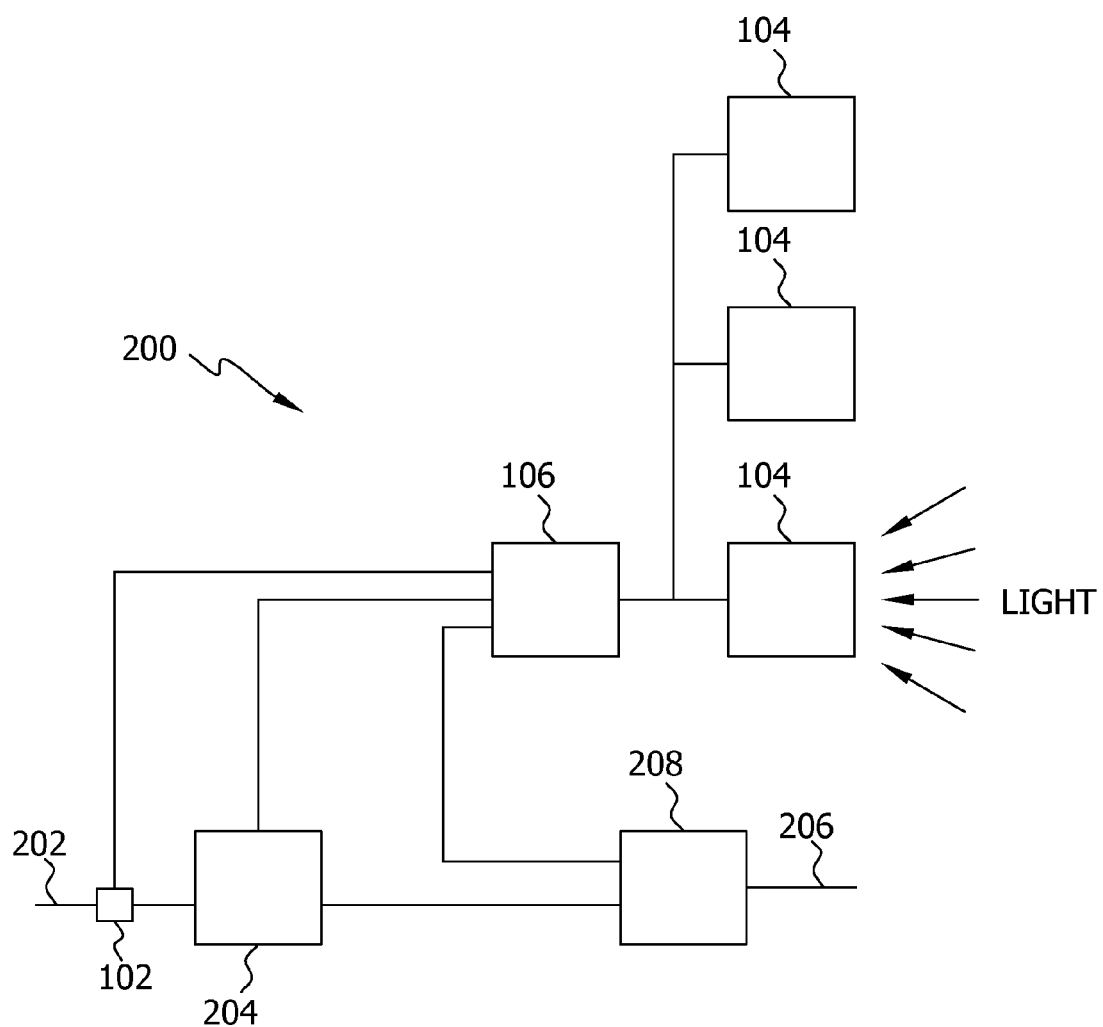
FIG. 2 is a schematic block diagram of an exemplary power equipment protection system that includes the arc flash detection device shown in FIG. 1.

FIG. 2 is a schematic block diagram of an exemplary power equipment protection system 200 that includes arc flash detection device 100. As shown in FIG. 2, a line conductor 202 is coupled to a circuit breaker 204. Current sensor 102 is also coupled to line conductor 202 to measure a current level through line conductor 202. Moreover, a load conductor 206 is coupled to a plasma-triggered arc containment device 208. Line conductor 202 may be a feeder line or a main bus line.

Circuit breaker 204 operates a trip opening mechanism, such as a trip solenoid that releases a latch. The trip solenoid is typically energized by a separate battery, although some high-voltage circuit breakers are self-contained and include current transformers, protection relays, and an internal control power source. Once a fault is detected, contacts within circuit breaker 204 open to interrupt current flow through line conductor 202. For example, mechanically-stored energy, such as a spring or compressed air, contained within circuit breaker 204 is used to separate the contacts. In some embodiments, a portion of the energy required may be obtained from the fault current.

When an arc flash event is detected by controller 106, a signal is sent to a circuit protection device. For example, an arc containment device 208 may be used to isolate the energy associated with the arc flash event. The energy associated with the detected arc flash is diverted away from line conductor 202 to arc containment device 208. A plasma gun (not shown) positioned within arc containment device 208 is activated to initiate a controlled and contained arc flash to facilitate protecting electrical components coupled to line conductor 202 and/or load conductor 206. Alternatively, controller 106 may cause circuit breaker 204 to trip.

Figure 3:
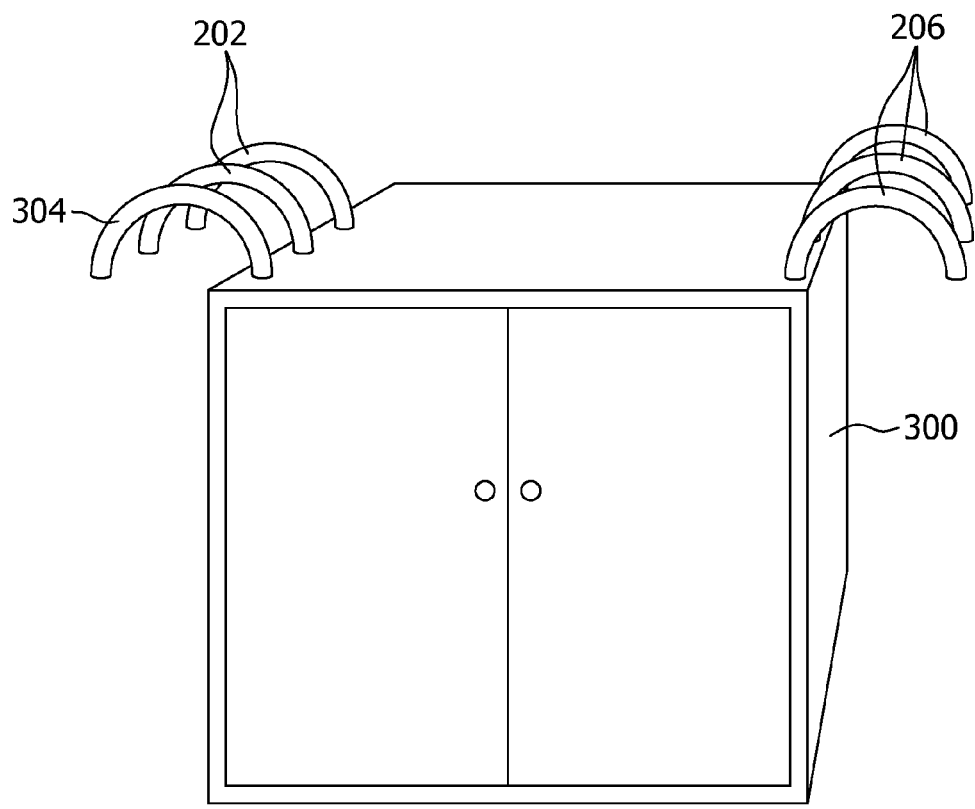
FIG. 3 is a schematic illustration of a closed equipment enclosure that contains the power equipment protection system shown in FIG. 2.
Figure 4:
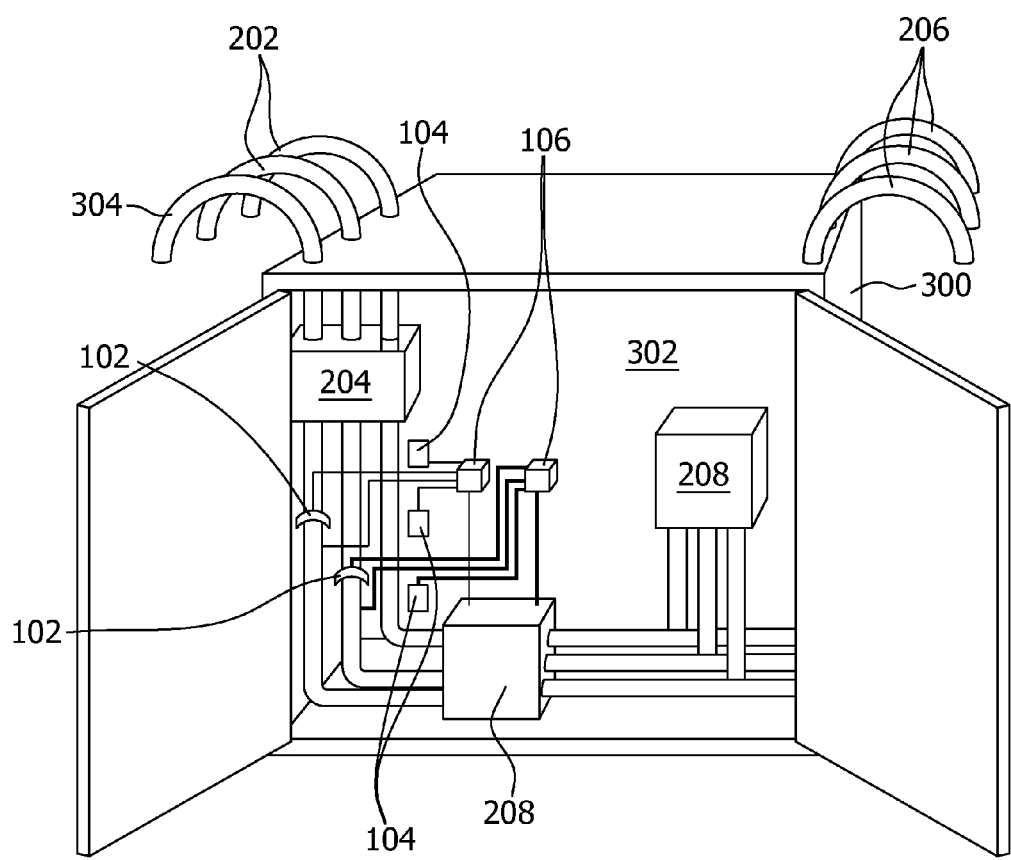
FIG. 4 is a schematic illustration of a closed equipment enclosure that contains the power equipment protection system shown in FIG. 2.

FIG. 3 is a schematic illustration of a closed equipment enclosure 300, and FIG. 4 is a schematic illustration of an interior 302 of equipment enclosure 300. A plurality of line conductors 202 and a main bus 304 enter equipment enclosure 300, and a plurality of load conductors 206 exit equipment enclosure 300. As shown in FIG. 4, power equipment protection system 200 is positioned within equipment enclosure 300 to facilitate preventing an arc flash event. For example, current sensor 102 is positioned to monitor a current level through main bus 304. Light sensor 104 is positioned to monitor an amount of light in proximity to a conductor. For example, light sensor 104 may be positioned to monitor an amount of light in proximity to main bus 304. In an alternative embodiment, equipment enclosure 300 may contain a plurality of arc detection devices 100, such as a first arc detection device for main bus 304 and a separate arc detection device for each line conductor 202. In such an embodiment, a first current sensor measures the current level through main bus 304 and a separate current sensor measures the current level through respective line conductors 202. Similarly, in such an embodiment, a first light sensor detects light in proximity to main bus 304 and a separate light sensor detects light in proximity to respective line conductors 202. Notably, a plurality of light sensors 104 may be located throughout equipment enclosure 300, and be communicatively coupled to respective controllers 106.

Circuit breaker 204 is positioned to enable a circuit interruption to be initiated in main bus 304 under control of controller 106. Moreover, in some embodiments, additional circuit breakers are positioned to enable a circuit interruption to be initiated in respective line conductors 202 under control of respective controllers 106. Moreover, arc containment device 208 is positioned to enable a rerouting of electrical energy when controller 106 detects an arc flash event. Alternatively, controller 106 may cause circuit breaker 204 to trip upon detection of an arc flash event.

During operation, controller 106 measures a current level using current sensor 102. For example, current sensor 102 measures, such as periodically measures, a current level through a conductor of main bus 304, for example. Current sensor 102 also transmits a signal representative of the current level to controller 106. Alternatively or in addition, multiple current sensors 102 may measure a current level through a conductor of each of main bus 304 and one or more line conductors 202, and transmit signals representative of the current levels to one or more controllers 106.

Moreover, controller 106 detects a light event using light sensor 104. For example, when a sufficient intensity of light impinges on light sensor 104, it transmits a signal indicative of the light event to controller 106. Alternatively or in addition, multiple light sensors 104 may be positioned to detect light events each of main bus 304 and one or more line conductors 202, and transmit signals representative of the detection of light events to one or more controllers 106.

Figure 5:
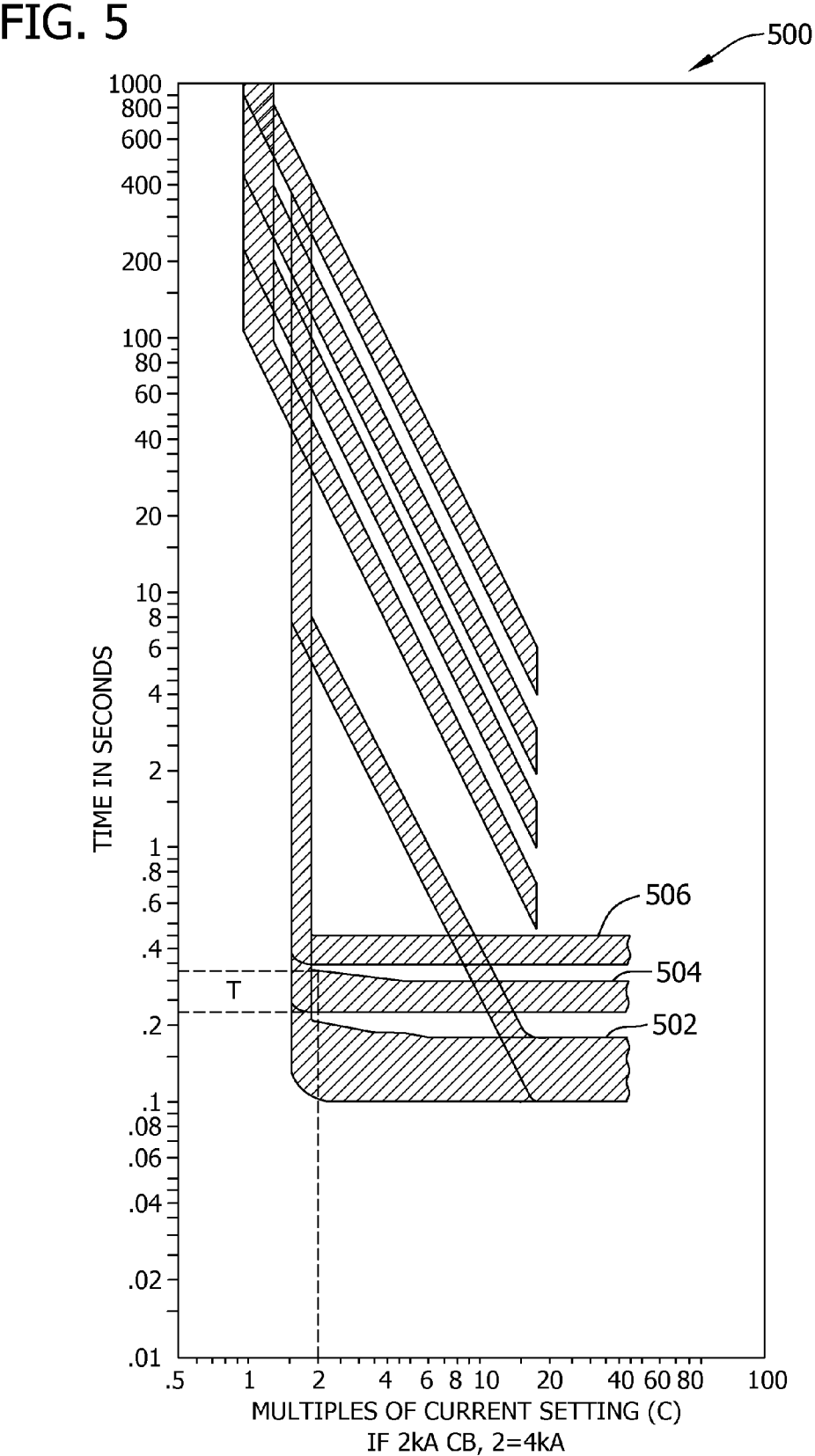
FIG. 5 is a graph that illustrates a relationship between current and timing of a trip of a circuit breaker that may be used with the arc flash detection device shown in FIG. 1.

Based on the current level and the detection of the light event, controller 106 determines whether the light event is originated from an arc flash event or whether the light event originated from operation of circuit breaker 204 using a relationship between current levels and timing of light events that is stored in memory area 108 (shown in FIG. 1). FIG. 5 is a graph 500 that illustrates the relationship between current and timing of a trip of circuit breaker 204. The x-axis is a multiple of a current setting for circuit breaker 204 and the y-axis is a time measurement in seconds. For example, for a circuit breaker that is rated for 2,000 amperes, a value of 2 on the x-axis corresponds to a current of 4,000 amperes. As shown in FIG. 5, circuit breaker 204 can be configured to trip based on a minimum band 502, an intermediate band 504, or a maximum band 506. Using intermediate band 504 as a reference, if circuit breaker 204 senses a current level sufficient to cause a trip, circuit breaker 204 initiates a circuit interruption. The circuit interruption occurs over a time period T that varies with the current level. For example, as shown in FIG. 5, at a current level of approximately 4,000 A, the circuit interruption occurs over a time period T that is between approximately 0.22 seconds and approximately 0.31 seconds. Upon receiving the signal from light sensor 104 that indicates that a light event has been detected, controller 106 determines the time period T that is associated with the current level received from current sensor 102. If controller 106 determines that the light event occurred during the time period T, controller 106 enables circuit breaker 204 to complete the circuit interruption. However, if controller 106 determines that the light event occurred outside of the time period T, controller 106 activates arc containment device 208 (shown in FIG. 2) and/or causes circuit breaker 204 to trip. In some embodiments, controller 106 adds a preselected amount of time to the time period T to ensure that circuit breaker 204 is provided with enough time to complete the circuit interruption and to facilitate decreasing the opportunities for a nuisance trip.

In an alternative embodiment, circuit breaker 204 transmits a signal to controller 106 that indicates to controller 106 that circuit breaker 204 is initiating a circuit interruption. Controller 106 determines from the time-based correlation stored in memory area 108 and illustrated in FIG. 5, the time period T that is associated with completing the circuit interruption by circuit breaker 204. During the time period T, controller 106 does not activate arc containment device 208. Rather, controller 106 enables circuit breaker 204 to complete the circuit interruption.

In another alternative embodiment, a rapid decrease in the measured current level can signify that circuit breaker 204 is initiating a circuit interruption. When controller 106 detects a decrease in the current level, controller 106 does not activate arc containment device 208 during at least the time period T. Rather, controller 106 enables circuit breaker 204 to complete the circuit interruption.

Exemplary embodiments of methods, systems, and apparatus for use in detecting an arc flash event using light and time discrimination are described above in detail. The methods, systems, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary electrical power distribution system environment, embodiments of the invention are operational with numerous other general purpose or special purpose system environments or configurations. The system environment described herein is not intended to suggest any limitation as to the scope of use or functionality of any aspect of the invention. Moreover, the system environment described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a circuit breaker, said method comprising:
   detecting a light event using a light sensor; and
   determining, by a controller, whether the light event originated from operation of the circuit breaker.

2. A method in accordance with claim 1, further comprising measuring a current level through a circuit using a current sensor.

3. A method in accordance with claim 2, further comprising determining whether the light event is detected within a time period during which the circuit breaker is configured to open in response to the current level.

4. A method in accordance with claim 3, further comprising activating an arc flash containment device when the light event is detected outside of the time period.

5. A method in accordance with claim 1, further comprising receiving a signal from the circuit breaker indicating that the circuit breaker is opening.

6. A method in accordance with claim 5, further comprising ignoring the light event during a time period associated with the circuit breaker opening.

7. A method in accordance with claim 1, further comprising detecting a decrease in the current level indicative of the circuit breaker opening and ignoring the light event during a time period associated with the circuit breaker opening.

8. A power equipment protection system comprising:
   a circuit breaker;
   a current sensor configured to measure a current through a circuit;
   a light sensor configured to detect a light event; and
   a controller communicatively coupled to said current sensor and to said light sensor, said controller configured to determine whether the light event originated from operation of said circuit breaker.

9. A power equipment protection system in accordance with claim 8, wherein said controller is further configured to determine whether the light event is detected within a time period during which said circuit breaker is configured to open in response to the current level.

10. A power equipment protection system in accordance with claim 9, wherein said controller is further configured to determine the time period based on the current level.

11. A power equipment protection system in accordance with claim 9, wherein said controller is further configured to activate a circuit protection device when the light event is detected outside of the time period.

12. A power equipment protection system in accordance with claim 8, wherein said controller is further configured to receive a signal from said circuit breaker indicating that said circuit breaker is opening.

13. A power equipment protection system in accordance with claim 12, wherein said controller is further configured to ignore the light event during a time period associated with said circuit breaker opening.

14. A power equipment protection system in accordance with claim 8, wherein said controller is further configured to detect a decrease in the current level indicative of said circuit breaker opening and to ignore the light event during a time period associated with said circuit breaker opening.

15. A controller for use with a power equipment protection system, said controller comprising:
    a processor configured to:
       receive a signal representative of a measured current level from a current sensor;
       receive a signal representative of a detection of a light event from a light sensor; and
       determine whether the light event originated from operation of a circuit breaker.

16. A controller in accordance with claim 15, further comprising a memory area configured to store circuit breaker trip data, including a plurality of current levels and a respective time period necessary for a circuit breaker to open at each of the plurality of current levels.

17. A controller in accordance with claim 16, wherein said processor is further configured to determine whether the light event is detected within a time period during which the circuit breaker is configured to open in response to the current level.

18. A controller in accordance with claim 17, wherein said processor is further configured to activate a circuit protection device when the light event is detected outside of the time period.

19. A controller in accordance with claim 15, wherein said processor is further configured to receive a signal from the circuit breaker indicative of the circuit breaker opening and to ignore the light event during a time period associated with the circuit breaker opening.

20. A controller in accordance with claim 15, wherein said processor is further configured to detect a decrease in the current level indicative of the circuit breaker opening and to ignore the light event during a time period associated with the circuit breaker opening.

* * * * *